Sept. 5, 1944. H. C. HOBAN 2,357,719
COUPLING FOR ELECTRIC CABLES
Filed Feb. 16, 1942

INVENTOR
Hugh Charles Hoban
BY Stebbins and Blenko
ATTORNEY

Patented Sept. 5, 1944

2,357,719

UNITED STATES PATENT OFFICE 2,357,719

COUPLING FOR ELECTRIC CABLES

Hugh Charles Hoban, Dartford, England, assignor to W. T. Henley's Telegraph Works Company Limited, Westcott, Dorking, Surrey, England, a company of Great Britain Application February 16, 1942, Serial No. 431,089
In Great Britain April 2, 1941

4 Claims. (Cl. 173—332)

This invention relates to water-tight detachable electric couplings of the kind employed for connecting together two lengths of electric cable in such a manner that the two parts of the coupling are prevented from accidental separation by a slight tug on the cable but are allowed to separate on the occurrence of a predetermined load which is insufficient to damage the cable. In accordance with my invention I provide a coupling of the kind aforesaid which comprises one or more pairs of co-operating contacts positioned within a sleeve of rubber or like elastic material which fits over the adjacent ends of the sheaths of the coupled cable lengths and makes joint therewith and is divided transversely of its length into two parts which make joint with one another in a readily separable manner. The contacts are in the form of blades having interlocking surfaces which are held together by pressure exerted by the overlying part of the wall of the sleeve, which is elastically deformed by the adjacent blade when in its operative position. The shape of the interlocking surfaces and the pressure exerted by the wall of the sleeve are such that the two contacts are prevented from accidental separation by a slight tug on the cable, but are forced apart against the pressure exerted by the sleeve wall and allowed to separate on the occurrence of a predetermined load that is insufficient to damage the cable. Preferably the contact blades have their adjacent contacting surfaces corrugated, the corrugations extending in a direction transversely of the length of the blades, at least one of the blades being of resilient material or resiliently mounted so as to be capable of moving away from the other to an extent to disengage itself and release the coupling. The pressure applied by the elastic sleeve is preferably applied at or near the free end of the blade adjacent thereto. This may be effected by providing an outwardly extending projection at that end. The coupling can then be arranged to separate at any required pull on the cable by varying the length of the projection or the stiffness of the part of the sleeve wall in the region of the projection.

Figure 1:
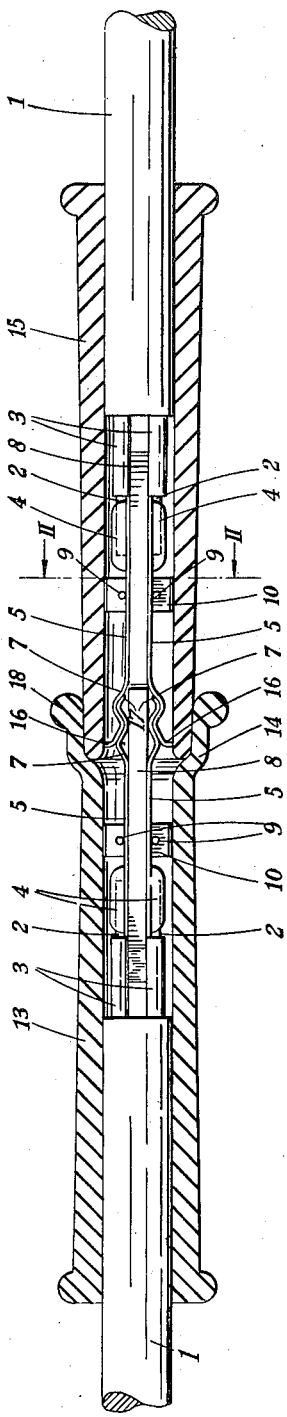
Figure 4:
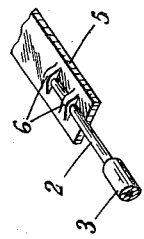
Figure 3:
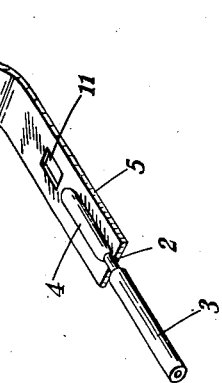
Figure 2:
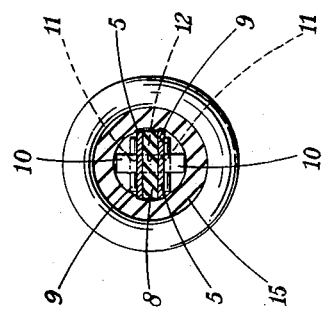

To enable the invention to be more fully understood a form of construction of the improved coupling that is suitable for a twin core rubber sheathed cable will now be described, by way of example, with the aid of the accompanying drawing wherein Figure 1 is a longitudinal section through the coupling, Figure 2 is a cross-section taken on the line II—II in Figure 1, Figure 3 is a perspective view of one of the contact tags, and Figure 4 is a perspective view showing an alternative method of securing a conductor to the contact tag.

In making the coupling shown in the drawing, the ends of the cables 1 are stepped back to expose the bared ends of the conductors 2 and the adjacent conductor insulation 3. Each conductor 2 is secured by a soldered connection 4 to one end of a tag 5 of metal strip, for instance, phosphor bronze strip. Alternatively the conductor may be secured mechanically in the manner shown in Figure 4 by threading it under the stamped out bridge pieces 6 and then flattening them by a pinching action. The other end of each tag 5 constitutes a transversely corrugated contact blade 7, the sides of the corrugations each making an angle of about 30° to the remaining flat surface of the tag. The two tags on each cable lie generally parallel with each other and are separated by a flat strip 8 of insulating material, for instance, of the material sold under the registered trade-mark "Bakelite." They are secured to the opposite faces of this strip by pins 9, for instance of brass or copper, which pass through a flat bar 10 of insulating material which passes through a slot 11 in each tag and a corresponding slot 12 in the separating strip 8. The bar 10, which may also be of "Bakelite," and the strip 8 together serve to centralize the tags within a rubber sleeve divided transversely of its length into two parts, 13 or 15, each cemented to the rubber sheath of the adjacent cable and extending beyond it to form a shroud for the tags. By making the flat parts of the two tags on each cable and the strip separating them equal in width to the internal diameter of the circular sleeve, the latter is distorted by the insertion of the contacts, as shown in Figure 2, with the result that they are not merely centralized within but firmly held by the surrounding sleeve. The end of the part 13 of the sleeve is in the form of a socket 14 adapted to receive and grip the end of the other part 15. The free ends of the contact blades shrouded by the part 15 of the sleeve are turned outwardly and the tips 16 thereof lie in contact with the wall of the part. The free ends of the blades shrouded by the sleeve 13 are turned inwardly and their tips 17 lie close to the surfaces of the separator plate 8 which extends just beyond them. The separator plate of the contact tags housed in the part 15 terminates at the junction of the corrugated and plain parts of each of the tags so that the two contact blades form a socket for the entry of a plug constituted by the separator plate and two mutually insulated contact blades housed within the part 13. By making the corrugated contact blades housed in the spigot ended part 15 equal in width to the internal diameter of the sleeve, the sleeve is distorted locally into a square form by the corrugations, with the result that in addition to the pressure applied at the extremity of the blade by engagement of the sleeve with the outwardly turned tips 16, a slight contact pressure is directly exerted along the length of the contact blade, which pressure is naturally increased when, following the insertion of the co-operating contact blades, the distance between them is increased.

To engage the two parts of the coupling, the socket portion 14 of the part 13 of the sleeve is rolled back, a movement facilitated by the rounded edge 18, and the spigot ended part 15 of the sleeve moved towards it to force the two corrugated contact blades with inwardly turned ends 17 between the two complementary corrugated contact blades with outwardly turned ends 16 until the two pairs of contacts are in full engagement as shown in Figure 1. During this movement the wall of the spigot ended part 15 will be further distorted by the outwardly projecting ends 16. When the contacts are in full engagement the socket end 14 of the part 13 is rolled back over the spigot end of the part 15. The pressure exerted by the overlapping parts of the sleeve on the outwardly turned ends 16 and the crests of the corrugations of the outer contacts holds them in engagement with the co-operating inner contacts on the other cable until there is exerted on the cable a pull sufficient to cause the outer two contacts to deform the rubber sleeve locally and move apart sufficiently to clear the inner two contacts, and so release the two parts of the coupling. As an indication of the mechanical characteristics of our improved coupling it is pointed out that a coupling of the form shown in Figure 1, which is suitable for use with a cable having an external diameter of one quarter of an inch, may be designed to disconnect with a pull of 71 lbs. and to withstand a pull of just under 71 lbs. without disconnecting.

What I claim as my invention is:

1. A detachable coupling for electric cables comprising an insulating sleeve of elastic material, such as soft rubber, which fits over the adjacent ends of the sheaths of the coupled cables and makes joint therewith and is divided transversely of its length into two parts which make joint with one another in a readily separable manner, a pair of cooperating blade contacts, one located in each part of the sleeve and connected to the cable conductor therein, pressed together by pressure exerted by the overlying part of the wall of the sleeve which is elastically deformed by the adjacent blade, and means comprising a sloping surface on one contact blade directed away from the free end thereof and towards the cooperating blade and a surface on the co- operating blade for engaging with said sloping surface, for preventing accidental separation of the blades by a slight tug on the jointed cables but causing the blades to separate and release the coupling before the cables are subjected to a pull sufficient to damage them.

2. A releasable coupling for electric cables, comprising a sleeve of elastic material such as soft rubber which fits over the adjacent ends of the sheaths of the coupled cables and makes joint therewith and is divided transversely of its length into two parts which make readily separable joint with one another, a pair of contacts in the form of blades with co-operating transversely corrugated surfaces positioned in said sleeve, at least one of said blades being resilient and normally held in engagement with the other blade by pressure applied by the surrounding wall of the said sleeve but caused by a pull on the jointed cables of a pre-determined value that is insufficient to damage them to move away from the other of said pair of blades to an extent to disengage itself and release the coupling.

3. A releasable coupling for electric cables, comprising a sleeve of elastic material such as soft rubber which fits over the adjacent ends of the sheaths of the coupled cables and makes joint therewith and is divided transversely of its length into two parts which make readily separable joint with one another, a pair of contacts in the form of blades with co-operating transversely corrugated surfaces positioned in said sleeve, at least one of said blades being resiliently mounted and normally held in engagement with the other blade by pressure applied by the surrounding wall of the said sleeve but caused by a pull on the jointed cables of a pre-determined value that is insufficient to damage them to move away from the other of said pair of blades to an extent to disengage itself and release the coupling.

4. In a coupling for connecting together two lengths of twin core electric cable, a pair of connecting tags secured to the conductors of one cable length and to the opposite faces of a separating strip of insulating material and with free ends constituting transversely corrugated inner contact blades, a pair of connecting tags secured to the conductors of the second cable length and to the opposite faces of a second separating strip of insulating material and with free ends extending beyond the separating strip and constituting transversely corrugated outer contact blades with outwardly directed tips to facilitate entry of the inner blades between them, and a housing formed of a two-part sleeve of elastic material such as rubber, the remote ends of the parts of which are jointed to the cables and the adjacent ends of the parts of which overlap one another and exert pressure on the outer contact blades sufficient to maintain them in engagement with the two inner contact blades until the coupling is subjected to the load at which it is designed to separate.

HUGH CHARLES HOBAN.